United States Patent [19]

Lloyd et al.

[11] 4,283,688
[45] Aug. 11, 1981

[54] LASER AUTOALIGNMENT SYSTEM

[75] Inventors: Wayne B. Lloyd, Baltimore, Md.; Robert J. Bernhard, Ames, Iowa; Dale R. Logan, Columbia; Ronald W. Minarik, Lutherwille, both of Md.

[73] Assignee: The United States of America as represented by the Secretary of the Air Force, Washington, D.C.

[21] Appl. No.: 97,594

[22] Filed: Nov. 26, 1979

[51] Int. Cl.³ .............................................. H01S 3/05
[52] U.S. Cl. .............................. 331/94.5 D; 356/149; 356/153
[58] Field of Search ...................... 331/94.5 C, 94.5 D; 356/149, 153; 350/285

Primary Examiner—William L. Sikes
Assistant Examiner—Leon Scott, Jr.
Attorney, Agent, or Firm—Donald J. Singer; Jacob N. Erlich

[57] ABSTRACT

An autoalignment system for a laser having a pair of reflector assemblies capable of providing six degrees of freedom of movement to the reflector element formed as part of each of the reflector assemblies. Each reflector assembly is made up of a reflector unit, a gimbal knuckle joint and a translator mechanism. The interconnection between the reflector unit and the gimbal knuckle joint provides for two degrees of freedom while the translator mechanism and its interconnection with the gimbal knuckle joint provides the additional four degrees of freedom. Cooling of the reflector elements is accomplished by way of a coolant system which is incorporated within the autoalignment system of the laser, while motivation of the autoalignment system is in the form of a plurality of drivers operably connected to the various elements of the reflector assembly. During utilization of the system in a vibrational environment, the autoalignment system maintains the correct relationship between the reflecting elements of the laser as well as providing sufficient cooling thereof.

16 Claims, 8 Drawing Figures

LASER AUTOALIGNMENT SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to lasers, and, more particularly to an autoalignment system for lasers in which the usual optical bench utilized for mounting the resonator reflectors is omitted.

Airborne electro-optical systems which require a high degree of pointing accuracy such as lasers, TV imagers, and cameras, are extremely sensitive to aircraft vibrations. Lasers utilize, for their operation, an active material located within a laser cavity which is made optically resonant by placing reflectors at either end thereof to form the optical resonator of the laser.

It has long been recognized that the alignment and optical figure of the resonator reflectors of the laser are of critical importance in order to maintain maximum output. Consequently, lasers subject to vibration such as in an aircraft are affected because of their requirement for precise alignment of the output beam. This not only means the overall device requires precise pointing control but that the alignment of the internal components such as the laser resonator reflectors or cavity mirrors is extrememly critical. Some factors which limit the pointing accuracy of high energy laser beams are as follows: dynamic alignment of the optical components, and vibration of mirrors, windows, optical benches and apertures. Such errors can be caused for example, by deformation of the optical bench itself on which the laser is mounted. Consequently, the relative motion of the optical resonator reflectors will reduce the output beam quality by adverse affect on resonator mode control. This relative motion can be quasi-steady (as due to G-loading) or vibratory in nature.

In the past, heavy rigid benches for mounting lasers thereon were passively suspended on soft springs which produced low resonant frequencies, and thereby attenuated the higher frequency aircraft vibration. These optical benches, however, weighed many thousands of pounds and therefore were too large and heavy for aircraft with strict weight volume limitations. Some aircraft also experienced severe vibration environment and high-g manuevers that made the precise alignment of the resonator reflectors even more difficult.

In addition, resonator reflector design is often specified to be within 1/10 or 1/20 of a wavelength of light and frequency to be within 1/100 of a wavelength of light. In other words, deviations may represent less than 1/1,000,000 of an inch. The heat flux at the optically reflective surface of a laser cavity mirror is typically within the range of 10 to 100 watts/cm$^2$ or higher for many conventional lasers. Accordingly, cooling of the laser reflectors is required in order to maintain the stringent fabrication requirements of the reflectors under the high heat fluxes present at the optically reflective surface. The cooling of such laser reflectors also present a problem under conditions of severe vibrations or high-G maneuvers in that the coolant tubes must be manufactured in such a manner so as to be able to withstand severe vibration while maintaining optical alignment of the reflectors without the coolant fluid leaking from the tubes.

Therefore, a clearly defined need arises for an autoalignment system in the laser field, or any other field in which systems must be mounted which require a high degree of pointing accuracy and/or stability and yet is subject to a surrounding environment which is highly vibrational.

SUMMARY OF THE INVENTION

The autoalignment system for the laser of this invention overcomes the problems set forth in detail hereinabove by eliminating the usual optical bench utilized for cavity or resonator reflector mounting as well as substantially increasing the overall stability of the system. In addition, this is accomplished with considerable savings in weight and space of the total system. Furthermore, the laser autoalignment system of this invention allows for the use of optical resonators with high slimness ratios without concern for an optical bench of equally high slimness ratio.

It should be again pointed out that although the autoalignment system of this invention may find applicability with numerous devices other than lasers which require a high degree of stability in a vibrational environment, it is particularly suited for utilization in conjunction with a laser. Therefore, for other applications slight modification of the system of this invention may be required.

The optical resonator of the laser generally utilized with the autoalignment system of this invention is an unstable confocal type (positive branch) resonator with an oblique scraper to give a final amplifying pass. This type of optical resonator design requires only two reflector assemblies to be actively aligned, and in this respect, is preferred over the folded design in which the folding mirrors would add complexity to the system.

The underlining principle for the autoalignment system for benchless lasers as set forth in this invention is based upon each resonator reflector assembly leading its own independent inertial existance (for example six degrees of freedom isolation) with respect to the airframe to which it is ultimately attached and which it must follow through space. These inertially independent reflector assemblies are then commanded to maintain the correct relationship with respect to each other. Conditions are optimized to allow the principle of self-stabilization to apply to each actively isolated reflector assembly. Consequently, this should have the effect of reducing the required servo loop bandwidth to achieve resonator reflector alignment over the full spectrum of inputs in all six axes.

Since both reflector assemblies (i.e., the concave mirror and the small convex mirror and scraper) making up the resonator of the benchless laser of the autoalignment system of this invention are each gimbaled individually in an identical manner for the six degrees of freedom, description of this invention is made, for simplicity of understanding, with respect to only one of the reflector assemblies, for example, the reflector assembly containing the concave mirror.

Each reflector assembly contains a reflector unit having the appropriate mirror (i.e., the concave or convex and scraper mirrors), a gimbal knuckle joint and a translator mechanism to provide the six degrees of freedom. Additionally, an appendage is fixedly attached to each reflector unit to which the optical alignment instruments are attached, or in certain instances, the optical alignment instruments are attached to one appendage while a suitable counterweight is attached to the other appendage.

The reflector unit, which includes the mirror, its instrumentation appendage and its counterweight appendage (if necessary) forms a structurally stiff unit which is connected at the Az/El axes to the gimbal knuckle joint. The base of this gimbal knuckle joint rides in the translator mechanism which provides the additional degrees of freedom, that is, in the Roll, X, Y and Z direction. In all, the above movement provides for the total six degrees of freedom. The base of the translator mechanism is attached to the cavity or resonator end wall which in turn is affixed to a convenient aircraft structure. Thus, the reflector assembly has six degree freedom active isolation from the aircraft and the surrounding laser cavity walls.

The instrumentation and counterweight appendages for both reflector assemblies are also basically the same except in the case of the instrumentation package which consists of suitable return mirrors for the instrumentation package. The ray bundles from these instruments run parallel to the laser cavity outside the cavity to impinge upon the return mirrors attached to the other reflector assembly.

Stabilization of the autoalignment system of this invention is achieved by means of the appropriate instrumentation which in this invention can be, for example, in the form of a conventional high resolution laser interferometer, such as the Hewlett-Packard 5501 A Laser Transducer System. This instrumentation system is utilized as a position sensor in all six axes. Since the reflector assembly instrumentation package must be outside the cavity, while the laser resonator mirrors are inside the cavity, it is ncessary to penetrate the cavity sidewalls with the appendages to provide a holding means for the required instrumentation. The technique of sidewall penetration is important in the instant invention because of the undesirable coupling of sidewall vibration that could result from the dynamic seal that prevents leakage from ambient atmosphere to the vacuum inside the cavity. To overcome this problem, a variety of techniques may be utilized, for example, such as a rolling diaphragm, a mercury seal system wherein the pressure differential is sealed by a small differential height in a spinning annular manometer, or a stage aerodynamic seal similar in operation to the aerodynamic window for the HEL beam exit from the cavity, but requiring much less flow becuase of the much smaller aperture to be sealed.

Movement of the autoalignment system of this invention is accomplished by various conventional electrodynamic drivers which are connected to the appropriate elements of the reflector assemblies to provide the six degrees of freedom. The force ratings of the drivers are determined by the type of movement needed within the system, and generally relatively small size is adequate. The high g-forces of the aircraft maneuvering will be reacted by other means which do not form part of the instant invention, for example, techniques similar to the G-Adaptive insolator concept could be employed.

The coolant lines utilized by the autoalignment system of the benchless laser of this invention pass from the aircraft frame, through the translator mechanism to each of the mirrors of the reflector assemblies as well as in the return path through the same mechanisms. The coolant lines undergo motion relative to the frame, and often relative to each other as the six-degree of freedom mechanisms move. Rotational movement is permitted by shear deformation of bonded elastomeric rings or seals. The elastomeric seals are protected from hydrostatic forces by a torsion rod included within the system. The resistance to motion caused by these joints is that of the spring rate of the elastomeric seals and the torsion/stay rods. These spring rates can be made quite small and the travel range is suitable for the small mechanism travels involved. Consequently, coolant can be supplied to the mirrors of the reflector assemblies even during movement thereof.

It is therefore an object of this invention to provide an autoalignment system which is capable of providing six degrees of freedom of movement to a support body in operable relationship therewith.

It is a further object of this invention to provide an autoalignment system for lasers which is capable of maintaining alignment of the optical resonator reflectors relative to each other even within a highly vibrational environment without the use of an optical bench.

It is still a further object of this invention to provide an autoalignment system for benchless lasers which provides six degrees of freedom of movement of the resonator mirrors.

It is another object of this invention to provide an autoalignment system for benchless lasers which yields a considerable savings in the weight and space of the overall laser system.

It is still another object of this invention to provide an autoalignment system for benchless lasers which allows the use of long, unfolded optical resonators without concern for optical benches of equal length.

It is still another object of this invention to provide an autoalignment system for benchless lasers which is capable of controlling the angular jitter of the laser beam where the jitter is measured with respect to a coordinate system fixed in space.

It is still another object of this invention to provide an autoalignment system for benchless lasers which controls the nominal alignment of the beam within relatively wide (but safe) angular limits with respect to a coordinate system fixed to the aircraft.

It is a still further object of this invention to provide an autoalignment system for benchless lasers which is economical to produce and which utilizes conventional, currently available components that lend themselves to standard mass producing manufacturing techniques. For a better understanding of the present invention, together with other and further objects thereof, reference is made to the following description taken in conjunction with the accompanying drawing and its scope will be pointed out in the appended claims.

DETAILED DESCRIPTION OF THE DRAWING

DETAILED DESCRIPTION OF THE PREFERRED EMBODIMENT

Figure 1:
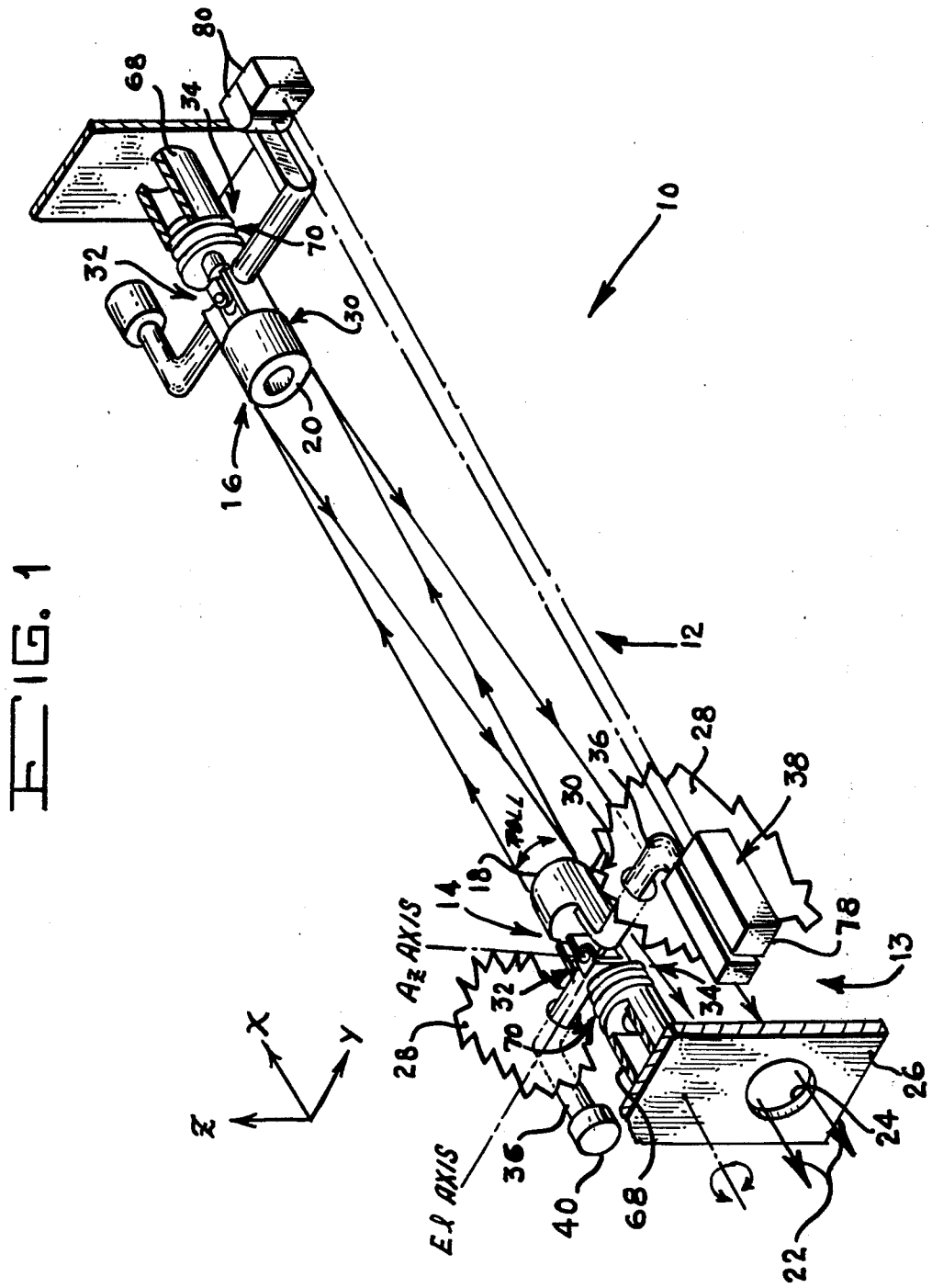
FIG. 1 is a pictorial representation of the autoalignment system for benchless lasers of this invention.

Reference is now made to FIG. 1 of the drawing which pictorially represents the laser autoalignment system 10 of this invention. For simplicity, and ease of understanding the inventive concept contained herein, FIG. 1 shows only the optical resonator 12 of a laser 13 utilizing the autoalignment system 10 of this invention. Again it should be emphasized that although a laser 13 is depicted utilizing the autoalignment system 10 of this invention, other devices which require stabilization in a highly vibrational environment can also utilize, with minimal modification, the autoalignment system 10 of this invention.

The optical resonator 12 of laser 13 is preferably of the unstable confocal type utilizing a pair of reflector assemblies 14 and 16. One of the reflector assemblies 14 contains a concave mirror 18 while the other reflector assembly 16 contains a small convex mirror and scraper 20, with the scraper giving the final amplifying path within resonator 12. Utilization of an unstable confocal type optical resonator 12 requires only two reflector assemblies 14 and 16 to have their respective mirrors 18 and 20 actively aligned, and therefore is preferred over the folded design in which the folding mirrors would add complexity to the system. The output of optical resonator 12 is in the form of a laser beam 22 which outputs through an aperture 24 located within one of the end walls 26 of the laser cavity. The sidewalls 28 of the laser cavity are shown broken away in FIG. 1 of the drawing so as to clearly illustrate the elements making up optical resonator 12 as well as autoalignment system 10 of this invention.

Figure 2:
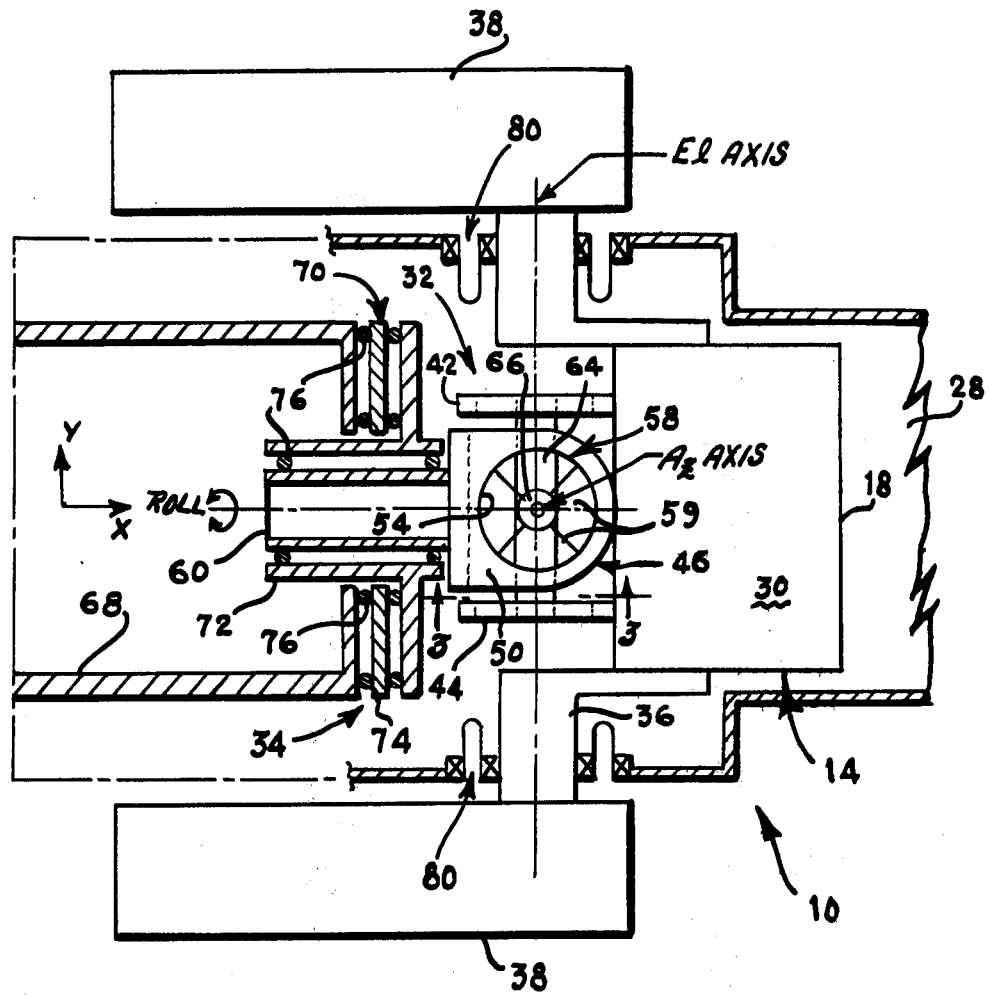
FIG. 2 is a plan view, shown partly in cross section, of the autoalignment system for benchless lasers of this invention.

As clearly depicted in FIGS. 1 and 2 of the drawing, each reflector assembly 14 and 16 is gimbaled so as to provide mirrors 18 and 20, respectively, with six degrees of freedom, even though six degrees of freedom for each mirror 16 and 18 may not be required. The six degree of freedom isolation by the instant invention is provided in order to protect reflector assemblies 14 and 16 from distortion (that is, at their structural resonances) by aircraft vibration or the like in any possible direction. Since both reflector assemblies 14 and 16 are gimbaled in an identical manner for the six degrees of freedom, the following detailed description of the autoalignment system 10 of this invention will refer with specificity to only one reflector assembly, that is, assembly 14, shown clearly in FIG. 2 of the drawing. In instances where their structural makeup is different, reference will be made to each individual reflector assembly 14 and 16, respectively. Therefore, in order to eliminate confusion, like reference numerals will be utilized for identical elements in each reflector assembly 14 and 16.

As indicated in FIGS. 1 and 2 of the drawing, each of the reflector assemblies 14 and 16 is capable of providing six degrees of freedom for the movement of mirror 18 and 20, respectively. With reference to reflector assembly 14, in particular, the six degrees of freedom are as follows: (1) the Az axis, (2) The El axis, (3) the Roll axis, (4) the X direction, (5) the Y direction and (6) the Z direction.

Reflector assembly 14 (as well as reflector assembly 16) is made up of three major components, (1) a reflector unit 30 which contains concave mirror 18 (or convex mirror and scraper 20) as part thereof, (2) a gimbal knuckle joint 32, and (3) a translator mechanism 34.

Reflector unit 30 has formed as a portion thereof, in addition to concave mirror 18, a pair of instrumentation appendages 36. Each appendage 36 protrudes, at opposite sides thereof, from reflector unit 30. A conventional instrumentation package 38 (the details of which will be set forth hereinbelow) is attached to each appendage 36, however, in some instances a suitable counterweight 40 (see FIG. 1) may replace one of the instrumentation packages 38.

Unit 30 is structurally stiff and is joined to gimbal knuckle joint 32 by means of a pair of outstanding elements 42 and 44 (shown clearly in FIG. 2 of the drawing) in a manner described more fully hereinbelow. The connection of reflector unit 30 to gimbal knuckle joint 32 establishes two degrees of movement of the six degrees of freedom of reflector assembly 14, that is, about the Az and El axes. The base of gimbal knuckle joint 32 rides in the translator mechanism 34 for the Roll and X direction degrees of freedom while translator mechanism 34 provides the remaining two degrees of freedom, that is, in the Y and Z direction. The base of translator mechanism 34 is attached to cavity end wall 26 or some other convenient structure such as the aircraft frame (not shown). Thus, stabilized mirror 18 has six degrees of freedom active isolation from the aircraft and laser cavity walls 28.

Reference is now made particularly to FIG. 2 of the drawing which shows in detail the mounting arrangement of reflector assembly 14. As stated hereinabove, since the mounting arrangement of reflector assembly 16 is identical to that of reflector assembly 14 a detailed description will only be given with reference to reflector assembly 14 and like numerals will be assigned to identical elements on reflector assembly 16.

Figure 3:
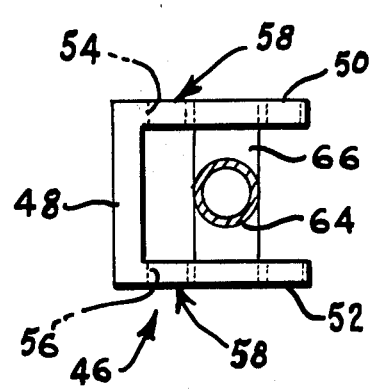
FIG. 3 is a view taken along line 3—3 of FIG. 2 and shown partly in cross-section of the autoalignment system for benchless lasers of this invention.
Figure 4:
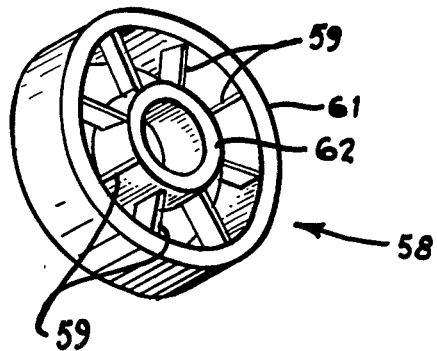
FIG. 4 is a pictorial representation of the annular flexural pivot arrangement used with the autoalignment system for benchless lasers of this invention.

Gimbal knuckle joint 32 is made up of a fork-shaped element 46 (shown in FIG. 3) having a rear support structure 48 as well as a pair of protruding arms 50 and 52. Disposed within each arm 50 and 52, is an aperture 54 and 56, respectively. Fixedly secured within each aperture 54 and 56 is an annular flexural pivot arrangement 58, best illustrated in FIG. 4 of the drawing. Each flexural pivot arrangement 58 is cylindrical in shape having radially disposed taut ribbon spokes 59 attached at the outer end thereof to an outer circumferential ring 61 and at the inner end thereof to an inner ring 62. This annular flexural pivot arrangement 58 is characterized by very high radial and axial rigidity and very low angular rigidity for small angular travel. Secured between upper and lower flexural pivot arrangement 58 are a pair of crossed hollow support rods 64 and 66 (shown best in FIGS. 2 and 3 of the drawing). Rod 66 is secured at each end thereof within respective inner rings 62 of pivot arrangement 58 while rod 64 intersects perpendicularly rod 66 at the midpoint thereof and is secured thereto by any suitable securing method such as being press fit therein.

Rod 64 supports at each end thereof the outstanding elements 42 and 44 of reflector unit 30. This type of arrangement provides support for reflector unit 30 about the Az and El axes. The angular travel around the Az/El axes, being quite small (approximately 5 milliradians), is accommodated by the annular flexural pivot arrangement 58.

Protruding from the rear support section 48 of fork-shaped element 46 is a hollow elongated support shaft 60. Support shaft 60 is in sliding engagement in the X direction and in rotational engagement along the Roll axis with translator mechanism 34. Translator mechanism 34 in addition to allowing the movement about the Roll axis and the X direction also permits the remaining two degrees of freedom to take place, that is, along the Y and Z direction. This is accomplished by the construction of translator mechanism 34.

Translator mechanism 34 is made up of a main support housing 68 fixedly secured at one end to cavity end wall 26 and at the other end thereof having a centrally disposed movable cylindrically-shaped housing 70. Housing 70 is made up of an outer bearing member 72 which circumscribes support rod 60 and an inner bearing member 74 which is situated between housing 68 and bearing member 72. Interposed between housing 68, bearing member 72 and bearing member 74 and support rod 60 are any suitable friction reducing means such as ring ball bearings 76. Translator mechanism 34 therefore provides the Roll/X/Y/Z degrees of freedom for reflector assembly 14. All travel which takes place in translator mechanism 34 is extremely small, that is, approximately 0.030 inches.

Reference is once again made to FIGS. 1 and 2 of the drawing which illustrate the instrumentation appendages 36. Although shown with a counterweight 40 on appendage 36 in FIG. 1 of the drawing, it is generally desirable to utilize, with this invention, instrumentation packages 38 on both sides of reflector unit 30 as shown in FIG. 2. To achieve the stabilization required in the instant invention, a conventional high-resolution laser interferometer, such as the Hewlett Packard 5501A Laser Transducer System, can be utilized with this invention as the position sensor in all six axes of travel. A typical Hewlett-Packard transducer system (although not shown in detail since its details do not form part of the instant invention and are conventional) is made up of a low-power, two-frequency Zeeman Laser 78 which emits two optical frequencies which have a frequency separation of approximately 1.8 MHz. The beam is passed through an interferometer which splits the beam into its two-frequency components directing them to two retro-reflectors 80 (as shown in FIG. 1) attached to the other reflector assembly 16 and returning the combined beams to a laser receiver. Relative motion between the retro-reflectors causes a Doppler shift in the difference frequency which is detected by the laser receiver. The basic resolution is ¼ of a wavelength of red light, approximately 6 microinches.

As shown in FIG. 2 of the drawing, since the instrumentation package 38 is outside the laser cavity walls 28 while the reflector assemblies 14 and 16 are inside, it is necessary to prevent an inrush of ambient air at approximately 760 Torr to the laser cavity wich may be at approximately 30 Torr. This is accomplished by providing a seal between both appendages 36 and their respective walls 28 of the laser cavity. Any number of conventional means are available for such purposes such as, for example, a rolling diaphram seal 81. Seals 81 allow freedom of motion of appendages 36, with respect to the sidewalls 28 and yet are capable of preventing the inrush of ambient air into the laser cavity.

Figure 5:
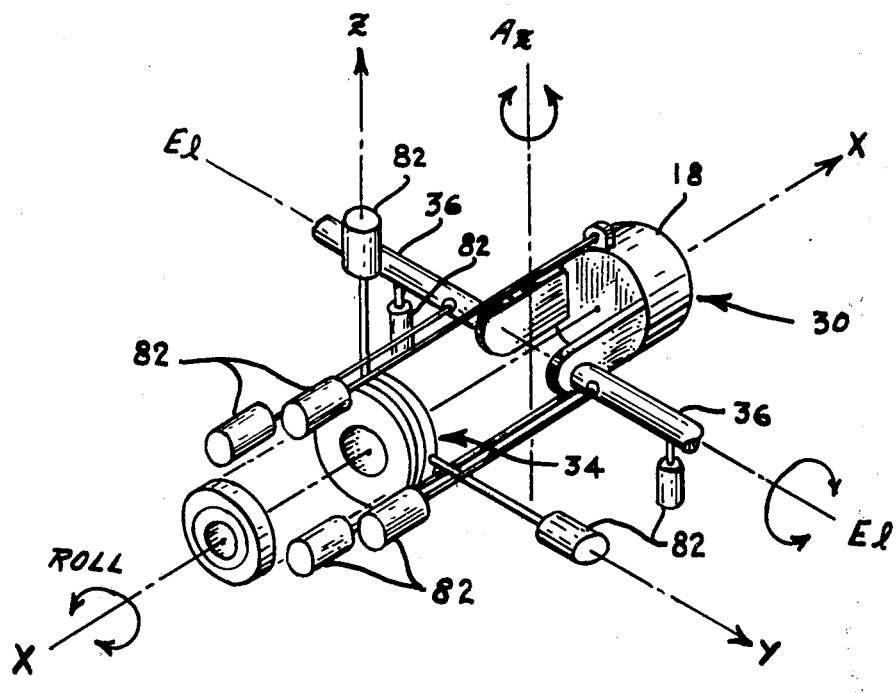
FIG. 5 is a pictorial representation of the drivers utilized with the autoalignment system for benchless lasers of this invention.

Reference is now made to FIG. 5 of the drawing which shows in pictorial schematic fashion (with numerous elements omitted for purposes of clarity) the relative, although not absolute position of a set of six conventional electro-dynamic drivers 82 which are connected to the various elements of the autoalignment system 10 of this invention. Drivers 82 provide the required minimal movement of the various elements of autoalignment system 10 under the influence and direction of the instrumentation package 38 described hereinabove. The electro-dynamic drivers 82 are small shakers made up of a permanent seal magnet and moving wire armature. The armature is supported by an upper and lower flexure. The shaker or driver 82 exerts a force which is proportional to the current applied to its armature. In this manner the various elements of the autoalignment system of this invention can be moved accordingly, generally very small amounts. In so doing, reflector assemblies 14 and 16 remain in constant alignment with each other even in highly vibrational environments.

Figure 6:
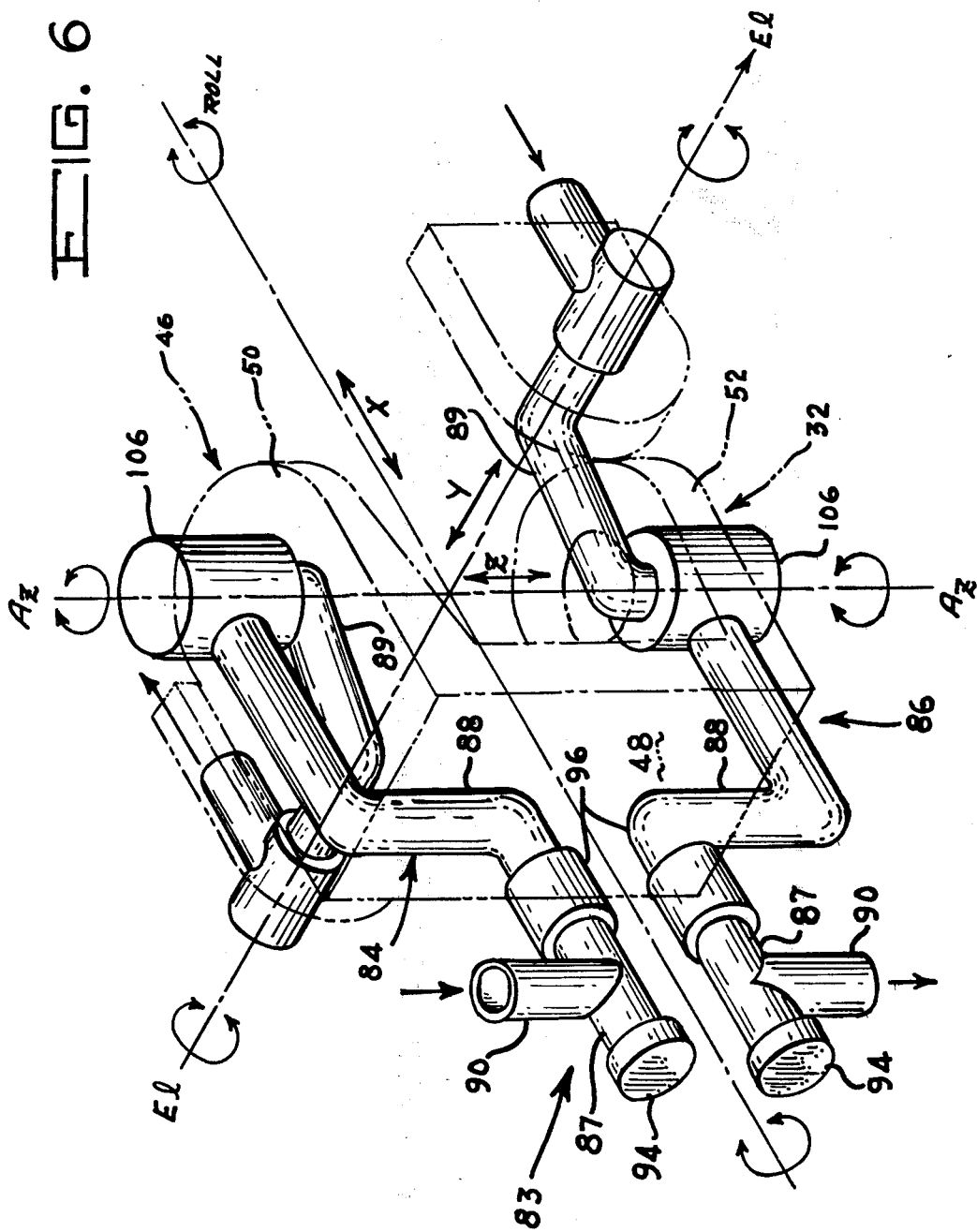
FIG. 6 is a pictorial representation of the coolant system for the autoalignment system for benchless lasers of this invention.
Figure 7:
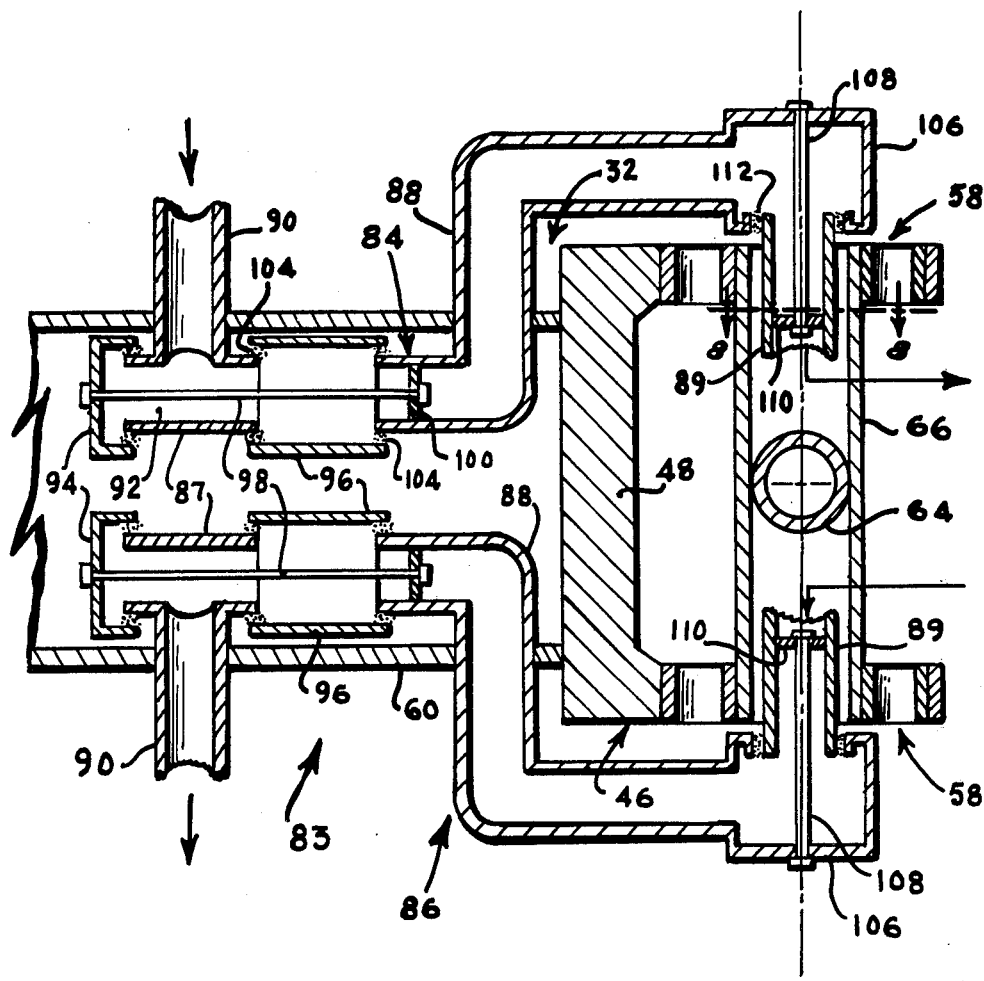
FIG. 7 is a side-elevational view, shown partly in cross section, of the coolant system of the autoalignment system for benchless lasers of this invention.

The cooling system 83 of the autoalignment system 10 of this invention is clearly depicted in FIGS. 6 and 7 of the drawing. FIG. 6 of the drawing illustrates in pictorial fashion the passage of the inlet coolant lines 84 from the aircraft frame (not shown), through translator mechanism 34 (not shown), and through gimbal knuckle joint 32 (shown in phantom) to mirror 18 (not shown), as well as the outlet path of coolant lines 86 from mirror 18 (not shown) through the same mechanisms as above. The details of coolant lines 84 and 86 have been previously omitted from the other Figures of the drawing for clarity, but FIGS. 6 and 7 can be easily related to the other Figures of the drawing by noting that coolant lines 84 and 86 enter and leave the reflector assembly 14 of autoalignment system 10 of this invention as shown in FIG. 2 of the drawing through the hollow support shaft 60.

A more detailed showing of inlet and outlet coolant lines 84 and 86 are depicted in FIG. 7 of the drawing. FIG. 7 shows in a cross-sectional view inlet lines 84 entering and exiting hollow shaft 60 before reentering hollow support rod 66 before passing into mirror 18 (not shown). Outlet lines 86 follow the identical path as inlet lines 84 except in the reverse order.

As with the description of reflector assemblies 14 and 16, the following description of inlet and outlet coolant lines 84 and 86 will be made with respect to only inlet lines 84 since both lines 84 and 86 are identical in construction. Therefore, like references numerals will be utilized in FIGS. 6 and 7 to identify identical elements of both coolant lines 84 and 86.

It should be noted that the construction of coolant lines 84 and 86 are unique since the cooling system 83 of the autoalignment system 10 of this invention undergoes motion relative to the elements making up autoalignment system 10 as well as with respect to the various portions of the coolant system itself as the reflector assemblies 14 and 16 undergo the six degrees of freedom of movement.

Figure 8:
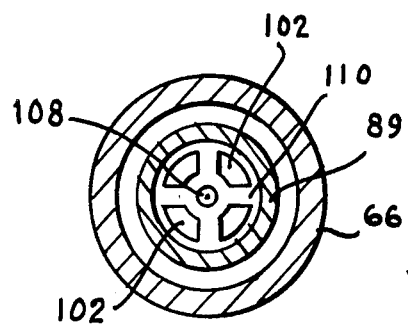
FIG. 8 is an enlarged cross-sectional view taken along line 8—8 of FIG. 7 of the autoalignment system for benchless lasers of this invention.

Inlet coolant lines 84 are made up of a plurality of preformed hollow coolant tubes 87, 88 and 89, having an inlet pipe 90 operably secured to the coolant tube 87 adjacent one end thereof. The coolant lines 84 are open at both ends thereof to allow the passage of any suitable coolant between a coolant source (not shown) and mirror 18. At the entrance end 92 of coolant tube 87 a cap 94 encloses end 92. Any suitable elastomeric seal 95 is interposed between cap 94 and tube 87. In order to allow a certain degree of flexibility of coolant lines 84 to take place it is necessary to provide as a means of joining tube 87 to tube 88 a cylindrically-shaped enlarged fitting 96 and a torsion rod 98. One end of torsion rod 98 is affixed to cap 94 while the other end of rod 98 has a piston-like element 100 attached thereto. Piston-like element 100 has a series of openings 102 therein (best shown in FIG. 8) for the purpose of allowing coolant to flow therethrough. A pair of elastomeric seals 104 provide a resilient sealing means between coolant tubes 87, 88 and fitting 96 in order to provide a minimal amount of flexibility to inlet coolant lines 84.

Although not utilizing a cap and fitting of the type described hereinabove, an enlarged integral fitting 106 is formed adjacent gimbal knuckle joint 32 in order to provide an equivalent function. Similarly, torsion rod 108 and a piston-like element 110 along with elastomeric seal 112 provides additional flexibility for the attachment of tube 88 to tube 89. Tube 89 is connected in any conventional manner to mirror 18. Although it is possible to utilize other coolant systems with the autoalignment system 10 of this invention, coolant system 83 provides adequate cooling for mirror 18 while allowing some degree of movement to take place within coolant lines 84 and 86 of coolant system 83.

For example, when tube 88 moves with gimbal knuckle joint 32 in the left-right (X axis) motion relative to the aircraft frame, the pivot arrangement 58, being connected to tube 89, transmits the motion to rod 98. Rod 98 causes cap 94 to move which causes shear deflection in the bonded elastomeric seal 95. Similar shearing motion occurs in the bonded elastomeric seals 104.

Azimuth angular motion causes tube 89 to rotate with respect to tube 88. This rotation is permitted by shear deformation of the elastomeric seal 112. The elastomeric seals are protected from hydrostatic forces by torsion rods 98 and 108, respectively. Without the stay action of rods 98 and 108 the elastomeric seals would be severely loaded and deformed by coolant pressures in the range of 600 psi acting, for example, on the full inner diameter of cap 94. Whereas, with the rods, the elastomeric seals feel only the force caused by the pressure on its annular area. The resistance to motion caused by these joints is that of the spring rate of the elastomer and the torsion/stay rod. This spring rate can be made quite small and the travel range is suitable for the small mechanism travel involved. The elastomer also introduces a small amount of damping.

It is clearly evident that with the autoalignment system 10 of this invention it is capable to maintain alignment of the optical resonator mirrors 18 and 20 relative to each other so that the laser 13 can function without an optical bench, i.e., in terms of output power, beam quality and jitter. In addition, the autoalignment system 10 of this invention is capable of controlling the annular jitter of the laser beam to be very small (in the order of $10\mu$ radians or less), where the jitter is measured with respect to a coordinate system fixed in space.

Although this invention has been described with reference to a particular embodiment, it will be understood to those skilled in the art that this invention is also capable of further and other embodiments within the spirit and scope of the appended claims.

We claim:

1. In a laser having a pair of end walls and a pair of side walls defining a laser cavity and an optical resonator located within said laser cavity bounded at opposed ends thereof by a first and second reflecting element, the improvement therein residing in a laser autoalignment system capable of providing six degrees of freedom of movement to said first and second reflecting elements, said autoalignment system comprising a first and a second reflector assembly disposed at opposite ends of said laser cavity, said first reflector assembly incorporating therein said first reflector element and said second reflector assembly incorporating therein said second reflector element, each of said first and second reflector assemblies comprising a reflector unit, a gimbal knuckle joint and a translator mechanism, said reflector unit having mounted on one end thereof one of said reflector elements, a pair of appendages protruding from each side of said reflector unit, each of said appendages passing through an opening located in each of said side walls, respectively, of said laser, at least one of said appendages having means connected to an end thereof and located outside of said laser cavity for aligning said reflector assemblies and means located within each of said openings in said side walls for sealing said opening between said appendage and said side wall, said gimbal knuckle joint having means at one end thereof for operably connecting the other end of said reflector unit to said gimbal knuckle joint for two degrees of freedom of movement with respect thereto, said translator mechanism having means at one end thereof for operably connecting the other end of said gimbal knuckle joint thereto for four degrees of freedom of movement with respect thereto, said translator mechanism being fixedly secured at the other end thereof to one of said end walls of said laser, means operably connected to said translator mechanism, said gimbal knuckle joint and said reflector unit for moving each of said reflector assemblies in said six degrees of freedom, and said alignment means on each of said reflector assemblies being in operable relationship with one another so as to provide signals to said moving means thereby enabling said moving means to provide each of said reflector assemblies with said six degrees of movement in accordance with said signals.

2. In a laser as defined in claim 1 wherein said autoalignment system further comprises a cooling system, said cooling system being in operable relationship with each of said reflector assemblies for movement therewith during said six degrees of movement of each of said reflector assemblies.

3. In a laser as defined in claim 2 wherein said cooling system comprises an inlet and an outlet line, each of said lines being formed of a plurality of tubes, means for securing said tubes together so that said tubes are capable of a small degree of movement with respect to each other.

4. In a laser as defined in claim 1 wherein said gimbal knuckle joint of said autoalignment system comprises a fork-shaped element made up of a rear support structure and a pair of protruding arms, means operably connected to each of said arms for supporting said other end of said reflector unit for said two degrees of freedom of movement and an elongated shaft protruding from said rear support structure, said elongated shaft being mounted in said translator mechanism for slidable and rotatable motion with respect thereto.

5. In a laser as defined in claim 1 wherein said translator mechanism of said autoalignment system comprises a main support structure fixedly secured to said one of said end walls, a movable housing supported by said main support structure, said movable housing having two degrees of freedom of movement with respect to said main support structure and said other end of said gimbal knuckle joint being slidably and rotatably mounted in said movable housing.

6. In a laser as defined in claim 5 wherein said gimbal knuckle joint of said autoalignment system comprises a fork-shaped element made up of a rear support structure and a pair of protruding arms, means operably connected to each of said arms for supporting said other end of said reflector unit for said two degrees of freedom of movement and an elongated shaft protruding from said rear support structure, said elongated shaft being mounted in said movable housing of said translator mechanism for said slidable and rotatable motion with respect thereto.

7. In a laser as defined in claim 6 wherein said autoalignment system further comprises a cooling system, said cooling system being in operable relationship with each of said reflector assemblies for movement therewith during said six degrees of movement of each of said reflector assemblies.

8. In a laser as defined in claim 7 wherein said elongated shaft of said gimbal knuckle joint is hollow and said cooling system enters and exits said autoalignment system through said hollow shaft.

9. In a laser as defined in claim 4 wherein said means for supporting said reflector unit for two degrees of freedom of movement comprises a pair of cylindrically-shaped flexural pivot arrangements, each of said pivot arrangements being mounted in each of said protruding arms, respectively, a first rod interconnecting said pair of pivot arrangements, a second rod fixedly secured at the midpoint of said first rod, said second rod being disposed substantially transverse to said first rod and said other end of said reflector unit being connected to said second rod.

10. In a laser as defined in claim 9 wherein each of said flexural pivot arrangements comprises a cylindrically-shaped inner and outer ring, said inner and outer ring being supported by a plurality of radially extending spokes therebetween and said first rod being operably connected to said inner ring of each of said pivot arrangements.

11. An autoalignment system for providing six degrees of freedom of movement comprising at least one support assembly, said support assembly having a body, a gimbal knuckle joint and a translator mechanism, said gimbal knuckle joint having means at one end thereof for operably connecting said body to said gimbal knuckle joint for two degrees of freedom of movement with respect thereto, said translator mechanism having means at one end thereof for operably connecting the other end of said gimbal knuckle joint thereto for four degrees of freedom of movement with respect thereto and means operably connected to said translator mechanism, said gimbal knuckle joint and said body for moving said support assembly in said six degrees of freedom.

12. An autoalignment system as defined in claim 11 further comprising another support assembly juxtaposed said one support assembly, means operably connected to said support assemblies for aligning said support assemblies, said alignment means providing signals to said moving means thereby enabling said moving means to provide said support assemblies with said six degrees of movement in accordance with said signals.

13. An autoalignment system as defined in claim 12 wherein said gimbal knuckle joint of said autoalignment system comprises a fork-shaped element made up of a rear support structure and a pair of protruding arms, means operably connected to each of said arms for supporting said body for said two degrees of freedom of movement and an elongated shaft protruding from said rear support structure, said elongated shaft being mounted in said translator mechanism for slidable and rotatable motion with respect thereto.

14. An autoalignment system as defined in claim 12 wherein said translator mechanism of said autoalignment system comprises a main support structure, a movable housing supported by said main support structure, said movable housing having two degrees of freedom of movement with respect to said main support structure and said other end of said gimbal knuckle joint being slidably and rotatably mounted in said movable housing.

15. An autoalignment system as defined in claim 14 wherein said means for supporting said reflector unit for two degrees of freedom of movement comprises a pair of cylindrically-shaped flexural pivot arrangements, each of said pivot arrangements being mounted in each of said protruding arms, respectively, a first rod interconnecting said pair of pivot arrangements, a second rod fixedly secured at the midpoint of said first rod, said second rod being disposed substantially transverse to said first rod and said body being connected to said second rod.

16. An autoalignment system as defined in claim 15 wherein each of said flexural pivot arrangements comprises a cylindrically-shaped inner and outer ring, said inner and outer ring being supported by a plurality of radially extending spokes therebetween and said first rod being operably connected to said inner ring of each of said pivot arrangements.

* * * * *